(12) United States Patent
Conger et al.

(10) Patent No.: US 10,612,885 B2
(45) Date of Patent: Apr. 7, 2020

(54) DEVICE, SYSTEM, AND METHOD FOR IMPROVING ARCHERY ACCURACY

(71) Applicants: Ryan Lee Conger, Phoenix, NY (US); Keith Conger, Colorado Springs, CO (US); Clinton Conger, Brewerton, NY (US)

(72) Inventors: Ryan Lee Conger, Phoenix, NY (US); Keith Conger, Colorado Springs, CO (US); Clinton Conger, Brewerton, NY (US)

( * ) Notice: Subject to any disclaimer, the term of this patent is extended or adjusted under 35 U.S.C. 154(b) by 0 days.

(21) Appl. No.: 16/363,314

(22) Filed: Mar. 25, 2019

(65) Prior Publication Data

US 2019/0293382 A1 Sep. 26, 2019

Related U.S. Application Data

(60) Provisional application No. 62/648,080, filed on Mar. 26, 2018.

(51) Int. Cl.
| | |
|---|---|
| *F41B 5/00* | (2006.01) |
| *F41B 5/14* | (2006.01) |
| *G06F 3/0481* | (2013.01) |
| *G06T 11/20* | (2006.01) |
| *G06F 3/01* | (2006.01) |

(52) U.S. Cl.
CPC ............ *F41B 5/148* (2013.01); *F41B 5/1476* (2013.01); *F41B 5/1492* (2013.01); *G06F 3/017* (2013.01); *G06F 3/04815* (2013.01); *G06T 11/206* (2013.01)

(58) Field of Classification Search
CPC .. F41B 5/00; F41B 5/14; F41B 5/1476; F41B 5/148; F41B 5/1484
See application file for complete search history.

(56) References Cited

U.S. PATENT DOCUMENTS

| | | | | |
|---|---|---|---|---|
| 8,221,273 | B2 * | 7/2012 | Donahoe | F41B 5/14 473/578 |
| 9,141,215 | B2 * | 9/2015 | Donahoe | F41B 5/1403 |
| 10,345,169 | B2 * | 7/2019 | Dunham | F41B 5/1403 |
| 2011/0202152 | A1 * | 8/2011 | Barton | F41B 5/14 700/91 |
| 2019/0285492 | A1 * | 9/2019 | Dunham | G01L 19/08 |

* cited by examiner

*Primary Examiner* — John A Ricci
(74) *Attorney, Agent, or Firm* — Dunlap Bennett & Ludwig PLLC

(57) ABSTRACT

An archery accuracy device, system, and method for improving archery accuracy that can be tailored for each archer and their current archery equipment is provided. The archery accuracy device may embody a wireless accelerometer and gyroscope sensors coupled to an auto graphing software adapted to graphically represent multiple sets of bow movement data collected by the accelerometer and gyroscope sensors. The graphical representation of multiple data sets, each data set associated with a different attempted shot, may be layered over each other on in one graphical representation, thereby enabling the archer to compare and contrast in their quest to optimize the best stabilization, setup condition through this iterative process.

6 Claims, 2 Drawing Sheets

DEVICE, SYSTEM, AND METHOD FOR IMPROVING ARCHERY ACCURACY

CROSS-REFERENCE TO RELATED APPLICATION

This application claims the benefit of priority of U.S. provisional application No. 62/648,080, filed 26 Mar. 2018, the contents of which are herein incorporated by reference.

BACKGROUND OF THE INVENTION

The present invention relates to archery accessories and, more particularly, a device, system, and method for improving archery accuracy.

Currently, determination of the optimal balance of the setup of an archer's bow is often done through personal recommendations, which is unreliable since every person utilizes different forms and processes to developing the skill of archery accuracy. Similarly, everyone reacts to their bow in their own way when shooting archery. In short, recommendations are unreliable data, and in the absence of reliable data, results are based on inefficient guesswork. And due to the cost of equipment, individuals cannot afford trying multiple setups. Likewise, archers looking to reach and maintain a sufficient level of accuracy quickly, cannot afford to continually test for peak results.

As can be seen, there is a need for an inexpensive device, system, and method for improving archery accuracy that can be tailored for each archer and their current archery equipment.

The present invention embodies a small wireless accelerometer and gyroscope to collect data related to the movement of the archer's bow, wherein the resulting data is coupled to software adapted to graphically represent to users their bow movement relative to a site picture—"shot pattern". As a result of this graphical feedback, archers can visually appreciate how their setup adjustments translate to their bow's movement; specifically, adjustments can be made by the archer in response to a first data set of graphical representations of bow movement as well as a subsequent second data set of graphical representations of bow movement resulting from said response. The first, second, and subsequent sets of graphical representations of bow movement, or shot patterns, may be layered over in a cumulative graphical representation. The software may be adapted to automatically determine correct setup between first and second and so forth data sets as well as providing suggested changes to the setup. The test process continues until ideal setup for each individual user is determined. Thereby, the present invention removes human guessing and shows true, representative data specifically tailored to each individual to ensure the best setup for improving a user's shot.

SUMMARY OF THE INVENTION

In one aspect of the present invention, a device for improving accuracy when using an archery bow includes the following: a body; a fastener provided by the body for connecting said body to an archery bow; an accelerometer housed in the body; one or more gyroscope sensors housed in the body; and a graphing software operatively coupled to the accelerometer and the one or more gyroscope sensors, wherein the graphing software is configured to plot a graphical representation of data sets comprising locations in three-dimensional space of the body relative to time.

In another aspect of the present invention, a method for improving accuracy when using an archery bow includes the following: providing the above-mentioned device; providing a user interface operatively associated with the graphing software; removably fastening said device to the archery bow; shooting the archery bow one or more times; and plotting on the user interface, for each shooting, the graphical representation for a predetermined amount of time prior to and at a time of each shooting the archery bow, wherein said device is removably fastened to a bow riser or an arrow rest of the archery bow, and wherein the user interface simultaneously represents an image of a site picture targeted in at least one of the shootings.

These and other features, aspects and advantages of the present invention will become better understood with reference to the following drawings, description and claims.

and

Figure 1:
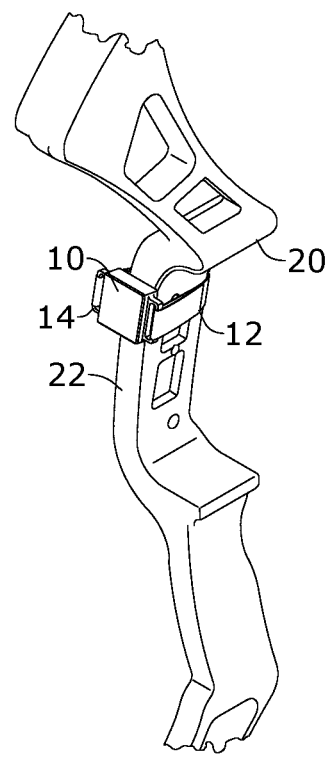
FIG. 1 is a perspective view of an exemplary embodiment of the present invention, shown in use.
Figure 2:
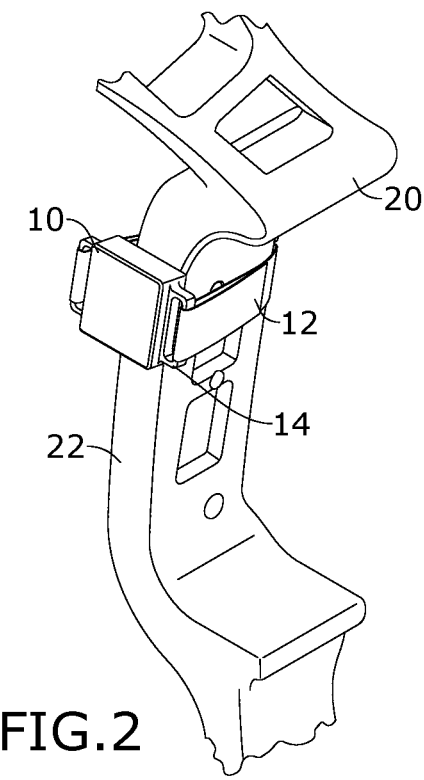
FIG. 2 is a detailed perspective view of an exemplary embodiment of the present invention, shown in use.
Figure 3:
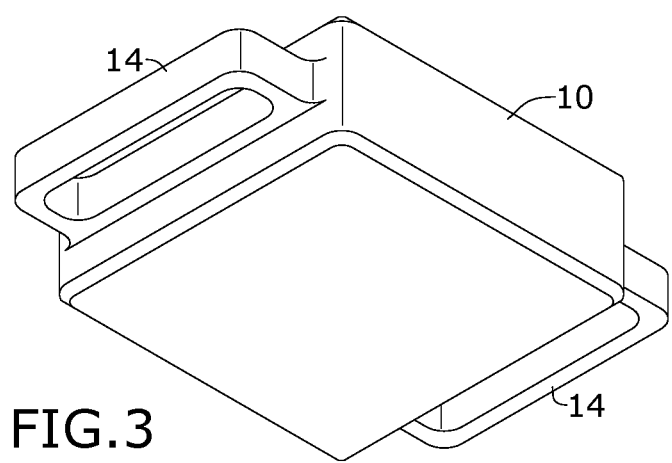
FIG. 3 is a perspective view of an exemplary embodiment of the present invention.
Figure 4:
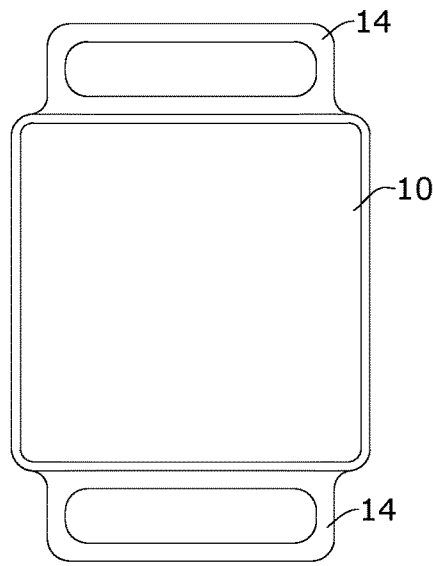
FIG. 4 is a top view of an exemplary embodiment of the present invention, shown in use.
Figure 5:
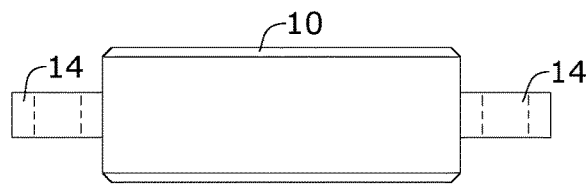
FIG. 5 is a side view of an exemplary embodiment of the present invention.
Figure 6:
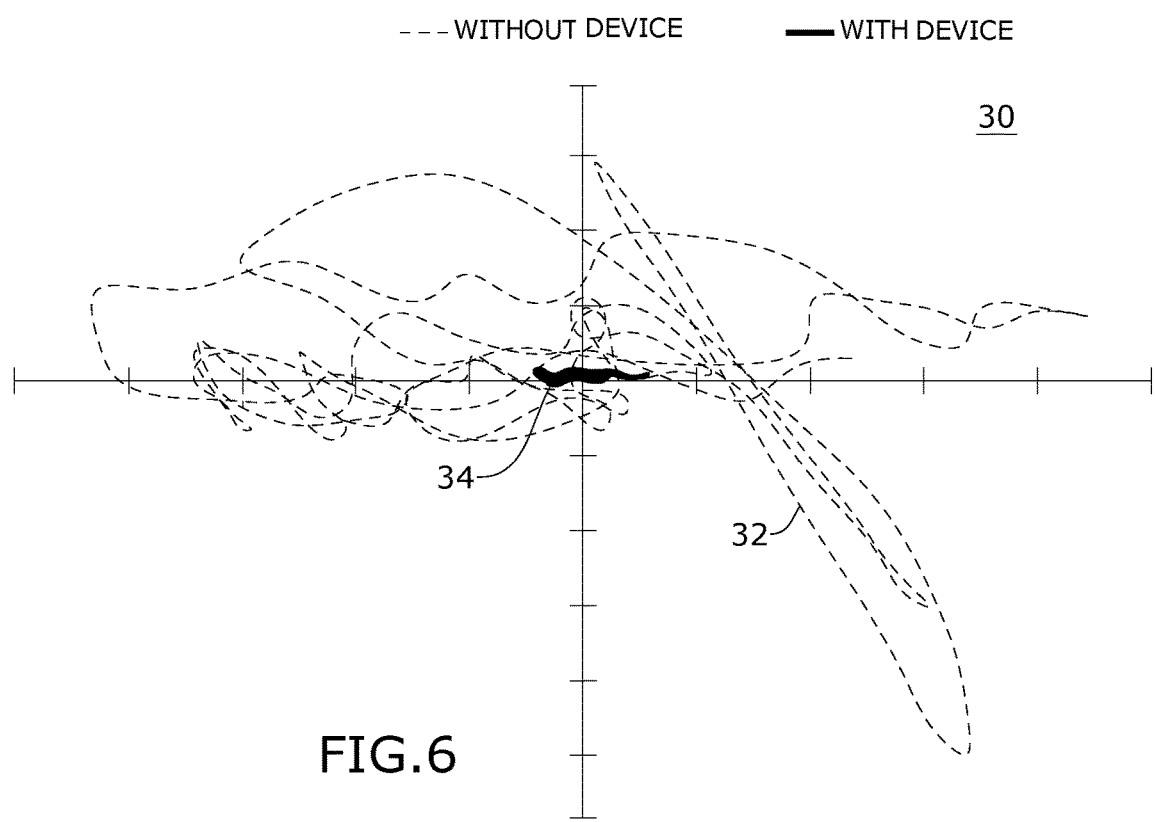

FIG. 6 is a schematic view of an exemplary embodiment of the present invention, illustrating shot patterns with and without the atomic sensor.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an archery accuracy device, system, and method for improving archery accuracy that can be tailored for each archer and their current archery equipment. The archery accuracy device may embody a wireless accelerometer and gyroscope sensors coupled to an auto graphing software adapted to graphically represent multiple sets of bow movement data collected by the accelerometer and gyroscope sensors. The graphical representation of multiple data sets, each data set associated with a different attempted shot, may be layered over each other on in one graphical representation, thereby enabling the archer to compare and contrast in their quest to optimize the best stabilization, setup condition through this iterative process.

Referring now to FIGS. 1 through 6, the present invention may include an archery accuracy device 10, system, and method for improving archery accuracy that can be tailored for each archer and their current archery equipment.

The archery accuracy device 10 may embody wireless accelerometer and gyroscope sensors—for example, a LE Bluetooth accelerometer/gyroscope sensor, as well as possibly other vibrational sensors. The archery accuracy device 10 may be coupled to at least one computer with a user interface. The computer may include at least one processing unit and a form of memory including, but not limited to, a microprocessor, a server, a laptop, and device, such as, a tablet and smart phone, or the like. The computer includes a program product including a machine-readable program code for causing, when executed, the computer to perform steps. The program product may include graphing software which may either be loaded onto the computer or accessed by the computer. The loaded graphing software may include an application on a smart device. The graphing software may be accessed by the computer using a web browser. The computer may access the graphing software via the web browser using the internet, extranet, intranet, host server, internet cloud and the like. The graphing software may include auto graphing software coupled to the wireless accelerometer and gyroscope sensors.

The archery accuracy device 10 may removably, removably connected to an archery bow, such as a bow riser 20 or the arrow rest 22, typically near or adjacent to the bow's grip and/or where the arrow is supported. The removable connection may be formed by straps 12 or any fasteners 14 known in the art for fastening or removably securing one object to another, so long as the archery accuracy device 10 functions in accordance with the present invention as described herein. In this connected position, the wireless accelerometer and gyroscope sensors may detect movement up/down/left/right and transmit respective data in x, y, and z plottable data sets to the computer. These data sets are received by said auto graphing software. The auto graphing software and/or computer may be adapted to compile the x, y, and z movement data sets collected by the accelerometer and gyroscope sensors connected to the bow when an archer is attempting to accurately hit a target or site picture. The auto graphing software may be adapted to provide a graphical representation 30 a first data set 34 of x, y, and z movement data sets on a user interface, as illustrated in FIG. 6. The auto graphing software may be adapted to distinguish movement data sets before and after an arrow is launched from the connected bow (for instance, through being coupled to a vibrational sensor), filtering x, y, and z movement data sets between said first data set 34 and subsequent sets, such as a second data set, a third data set of x, y, and z movement data, and so on. The graphical representation 30 may be superimposed over an image or representation of the site picture that the archer was targeting. Note, FIG. 6 also illustrates a negative data set 32 of x, y, and z movement data for an archer not incorporating the archery accuracy device 10.

A method of using the present invention includes a user adding weight to different portions of the bow, such as a frontal stabilizer bar, and then repeating said archer's attempt to accurately hit the target, thereby generating a first or subsequent data set of x, y, and z movement data. This test process is repeated, wherein each subsequent data set may be plotted graphically overlaying previous data sets, as illustrated in FIG. 6, thereby aiding in determining optimal weight mass and location. The auto graphing software may be adapted to graphically represent and compare, through overlapping data sets, all relevant data sets in on one graphical representation 30, thereby enabling the archer to optimize the best stabilization, setup condition (for example, the archer may take shots with different arrangements of a front stabilization bar, realizing that the front stabilization bar in a shortened arrangement is optimal after review the overlapping data sets) through this iterative process. The auto graphing software may be adapted to prompt the user with suggestions. Further the above example, if a shorter front stabilization bar displays a less steady graphical representation 30 relative to previous stabilization bar lengths or arrangements, then the user may selectively adjust the weight, wherein the graphical representation 30 may be used to determine an optimal, customized setup for said archer.

It should be understood, of course, that the foregoing relates to exemplary embodiments of the invention and that modifications may be made without departing from the spirit and scope of the invention as set forth in the following claims.

What is claimed is:

1. A device for improving accuracy when using an archery bow, comprising:
   a body;
   a fastener provided by the body for connecting said body to an archery bow;
   an accelerometer housed in the body;
   one or more gyroscope sensors housed in the body; and
   a graphing software operatively coupled to the accelerometer and the one or more gyroscope sensors, wherein the graphing software is configured to plot a graphical representation of data sets comprising locations in three-dimensional space of the body relative to time.

2. The device for improving accuracy when using an archery bow of claim 1, wherein the fastener comprises a strap.

3. A method for improving accuracy when using an archery bow, comprising:
   providing the device of claim 2;
   providing a user interface operatively associated with the graphing software;
   removably fastening said device to the archery bow;
   shooting the archery bow one or more times; and
   plotting on the user interface, for each shooting, the graphical representation for a predetermined amount of time prior to and at a time of each shooting the archery bow.

4. The method of claim 3, wherein said device is removably fastened to a bow riser of the archery bow.

5. The method of claim 3, wherein said device is removably fastened to an arrow rest of the archery bow.

6. The method of claim 3, wherein the user interface simultaneously represents an image of a site picture targeted in at least one of the shootings.

* * * * *